US008960765B2

(12) United States Patent
Facchinello et al.

(10) Patent No.: US 8,960,765 B2
(45) Date of Patent: Feb. 24, 2015

(54) FLEXIBLE FOLDING COVER

(71) Applicant: Extang Corporation, Ann Arbor, MI (US)

(72) Inventors: Jerome Facchinello, Yankton, SD (US); William Reminder, Yankton, SD (US)

(73) Assignee: Extang Corporation, Ann Arbor, MI (US)

( * ) Notice: Subject to any disclaimer, the term of this patent is extended or adjusted under 35 U.S.C. 154(b) by 0 days.

(21) Appl. No.: 14/089,814

(22) Filed: Nov. 26, 2013

(65) Prior Publication Data

US 2014/0152046 A1 Jun. 5, 2014

Related U.S. Application Data

(60) Provisional application No. 61/731,888, filed on Nov. 30, 2012.

(51) Int. Cl.
*B60P 7/02* (2006.01)
*B60J 7/14* (2006.01)

(52) U.S. Cl.
CPC ........................................ *B60J 7/141* (2013.01)
USPC .................................. 296/100.09; 296/100.06

(58) Field of Classification Search
USPC ............. 296/100.02, 100.06, 100.07, 100.08, 296/100.09, 100.1
See application file for complete search history.

(56) References Cited

U.S. PATENT DOCUMENTS

| 5,427,428 | A | * | 6/1995 | Ericson et al. | 296/98 |
|---|---|---|---|---|---|
| 2003/0184115 | A1 | * | 10/2003 | Armstrong et al. | 296/100.06 |
| 2007/0108792 | A1 | * | 5/2007 | Weldy | 296/100.09 |
| 2010/0140973 | A1 | * | 6/2010 | Duncan | 296/100.09 |
| 2010/0270824 | A1 | * | 10/2010 | Yue | 296/100.07 |
| 2012/0274091 | A1 | * | 11/2012 | Yue | 296/100.04 |
| 2012/0274092 | A1 | * | 11/2012 | Yue | 296/100.07 |

* cited by examiner

*Primary Examiner* — Lori L Lyjak
(74) *Attorney, Agent, or Firm* — Harness, Dickey & Pierce, P.L.C.

(57) ABSTRACT

A tonneau cover system for a cargo box of a pickup truck having a first tonneau section, a second tonneau section, a third tonneau section, and a fourth tonneau section, each being generally coplanar in an extended position. A first hinge system hingedly couples the first and second sections to permit pivotal stacked nesting of the first section relative to the second section. A second hinge system hingedly couples the second and third sections to permit pivotal stacked nesting of the combination of the first and second sections relative to the third section. Finally, a third hinge system hingedly couples the third section to the fourth section to permit pivotal movement of the combination of the first, second, and third tonneau sections relative to the fourth section into a retracted, stacked, and rotated upward position.

19 Claims, 12 Drawing Sheets

FLEXIBLE FOLDING COVER

CROSS-REFERENCE TO RELATED APPLICATIONS

This application claims the benefit of U.S. Provisional Application No. 61/731,888, filed on Nov. 30, 2012. The entire disclosure of the above application is incorporated herein by reference.

FIELD

The present disclosure relates to relates to coverings for pickup trucks and, more particularly, relates to a tonneau cover system having a plurality of foldable sections having a single cover member extending along the plurality of foldable sections and being generally-vertically stowable adjacent the cab of the pickup truck.

BACKGROUND

This section provides background information related to the present disclosure which is not necessarily prior art.

Tonneau covers have been used for a number of years to cover the cargo box of pickup trucks against dirt, debris, and other environmental contaminants and to improve the aesthetic quality thereof. Originally, tonneau covers were designed by upholstery shops and typically made of vinyl covered fabrics or canvas. The material was often doubled over along its edges for added strength and appearance. Male snaps were then attached to the sides of the cargo box of the pickup truck via fasteners, while female snaps were attached along the edges of the cover. Wooden bows were sometimes used to span the cargo box and ensure that the cover remained high enough to drain water. Unfortunately, these covers were sometimes difficult to handle and/or manufacture, and occasionally failed to protect the cargo box.

More recently, foldable tonneau covers are often more desirable in that they conveniently cover the bed of the pickup truck for cargo protection. However, when not in use, the foldable tonneau cover may be folded toward the rear of the passenger cabin (or other location). Generally, foldable tonneau covers include a frame network of cross bows, a tarp or covering operably coupled to and spanning the frame network, a latching system for coupling the frame network to the pickup truck and a means for stowing the latching system, and a hinge system for hingedly coupled adjacent sections of the foldable tonneau cover.

Unfortunately, in many conventional foldable tonneau cover systems, the foldable sections of the tonneau cover are folded from the rear end of the pickup truck bed toward the forward end of the pickup truck bed adjacent the cab into a stacked, horizontal configuration. In this way, a substantially portion of the tonneau cover remains covering the pickup truck bed when stacked. The size of the remaining portion is typically equal to the footprint, when viewed from above, of the stacked foldable sections. In other words, the size of the tonneau cover system that remains covering the pickup truck bed is typically about the size of a single foldable section, because at least one of the foldable sections is not typically folded away from the pickup truck bed and thus remains in a position concealing complete access of the pickup truck bed.

In order to gain complete access to the pickup truck bed, or at least maximize access to the bed, when using a conventional foldable tonneau cover system, one must completely remove the tonneau cover system from then pickup truck. However, it should be appreciated that full removal of the conventional foldable tonneau cover system is disadvantageous in that it requires storage of the now-removed system either in the bed of the pickup truck, which consumes valuable storage space in the bed, or at an off-truck location, which at a minimum can be inconvenient.

Accordingly, there exists a need in the relevant art to provide a tonneau cover system capable of overcoming the disadvantages of the prior art. Additionally, there exists a need in the relevant art to provide a tonneau cover system having a plurality of foldable sections having a single cover member extending along the plurality of foldable sections and being generally-vertically stowable adjacent the cab of the pickup truck.

SUMMARY

This section provides a general summary of the disclosure, and is not a comprehensive disclosure of its full scope or all of its features.

According to the principles of the present teachings, a tonneau cover system for a cargo box of a pickup truck is provided having advantageous construction and methods of operation. The tonneau cover system comprises a first tonneau section, a second tonneau section, a third tonneau section, and a fourth tonneau section, each being generally coplanar in an extended position. A first hinge system hingedly couples the first tonneau section and the second tonneau section to permit pivotal stacked nesting of the first tonneau section relative to the second tonneau section. A second hinge system hingedly couples the second tonneau section to the third tonneau section to permit pivotal stacked nesting of the combination of the first tonneau section and the second tonneau section relative to the third tonneau section. Finally, a third hinge system hingedly couples the third tonneau section to the fourth tonneau section to permit pivotal movement of the combination of the first tonneau section, the second tonneau section, and the third tonneau section relative to the fourth tonneau section into a retracted, stacked, and rotated upward position.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIGS. 1-4, a pickup truck 100 is shown having a foldable tonneau system 12 for use with pickup truck 100. Pickup truck 100 generally includes a cargo box 102 and a passenger cabin 104. Cargo box 102 includes a front wall 107 (FIG. 3), a left sidewall 108, a right sidewall 110, and a rear wall or tailgate 112. It should be understood that right sidewall 110 and left sidewall 108 of pickup truck 100 are identical, yet arranged in mirrored symmetry. Accordingly, in the interest of brevity, only one side will be discussed in detail below in connection with foldable tonneau system 12 unless noted otherwise.

Still referring to FIGS. 1-4, foldable tonneau system 12 includes, in some embodiments, a flexible, stretchable fabric cover 14 (or other suitable cover material being soft or hard) that is drawn tightly over a plurality of tonneau sections 16 to form a top surface 17 of foldable tonneau system 12. It should be understood that the principles of the present invention are equally applicable to foldable tonneau systems having two, three, four, or more sections, each foldable relative to adjacent sections. However, for purposes of this disclosure, a foldable tonneau system having four tonneau sections 16a, 16b, 16c, and 16n will be described. This configuration should not be regarded as limiting the claims herein. Tonneau sections 16a-16n may be referred to herein as first tonneau section 16a, second tonneau section 16b, third tonneau section 16c, and fourth tonneau section 16n. Generally, fourth tonneau section 16n is configured to be fixedly coupled to sidewalls 108, 110 of pickup truck 100 to retain fourth tonneau section 16n, and consequently foldable tonneau system 12, in coupled engagement with pickup truck 100. However, it is anticipated that fourth tonneau section 16n can be removed from the pickup truck 100, if desired. It should be understood that fourth tonneau section 16n can comprise similar structure as tonneau sections 16a-16c; however, it should also be understood that fourth tonneau section 16n can comprise a mounting beam or header having construction separate from the remaining tonneau sections.

First tonneau section 16a is configured to be selectively and conveniently coupled to sidewalls 108, 110 or tailgate 112 to permit easy access to the contents of cargo box 102. In this way, first tonneau section 16a is intended to be easily opened and closed as desired, while fourth tonneau section 16n is intended to be more robustly attached to pickup truck 100, while still permits removal if necessary.

Each of the plurality of tonneau sections 16a-16c (and in some embodiments 16n) includes an internal framework of support members that are attached to one another to form a rectangular frame. Specifically, first tonneau section 16a includes a front rail member 21 (FIGS. 2A and 2B) fixedly coupled to a pair of side members 22 via a corner insert 24. Corner insert 24 is preferably rounded along an exterior surface to prevent stress concentrations in fabric cover 14. Corner insert 24 includes a pair of male portions (not shown) sized to be fixedly received and engaged within front rail member 21 and the pair of side members 22. In some embodiments, an optional corner brace 26 is fixedly coupled, via conventional threaded fasteners, between front rail member 21 and each side member 22 to provide improved structural integrity. First tonneau section 16a further includes one or more cross bow members 28 being generally parallel to front rail member 21 and spaced apart therefrom (in some embodiments, other tonneau sections can also include cross bow members 28). In some embodiments, cross bow member 28 is generally C-shaped in cross section and is fixedly coupled to the pair of side members 22 via a corner brace 30 disposed on opposing ends thereof. It should be understood that additional or alternative connection features may be employed to couple cross bow member 28 to the pair of side members 22. Moreover, it should be understood that cross bow member 28 can be made of any suitable material and define any suitable cross-sectional size and shape. The pair of side members 22 is adapted to rest upon a top surface of sidewalls 108 and 110.

Similarly, fourth tonneau section 16n includes a rear rail member 20, similar to front rail member 21, fixedly coupled to a pair of side members 23, similar to side members 22, via a corner insert 24. An optional corner brace 26 is fixedly coupled, via conventional threaded fasteners, between rear rail member and each side member to provide improved structural integrity. In some embodiments, fourth tonneau section 16n can includes a cross bow member, similar to cross bow member 28, being generally parallel to rear rail member and spaced apart therefrom. For manufacturing simplicity, the cross bow member can be identical or at least similar throughout the tonneau system. However, it should be appreciated that this is not required.

For additional detail relating to the construction of tonneau sections 16a, 16b, 16c, and 16n, and their association interconnection, attention should be directed to commonly-assigned U.S. Pat. No. 7,188,888, which is incorporated herein by reference.

Figure 1:
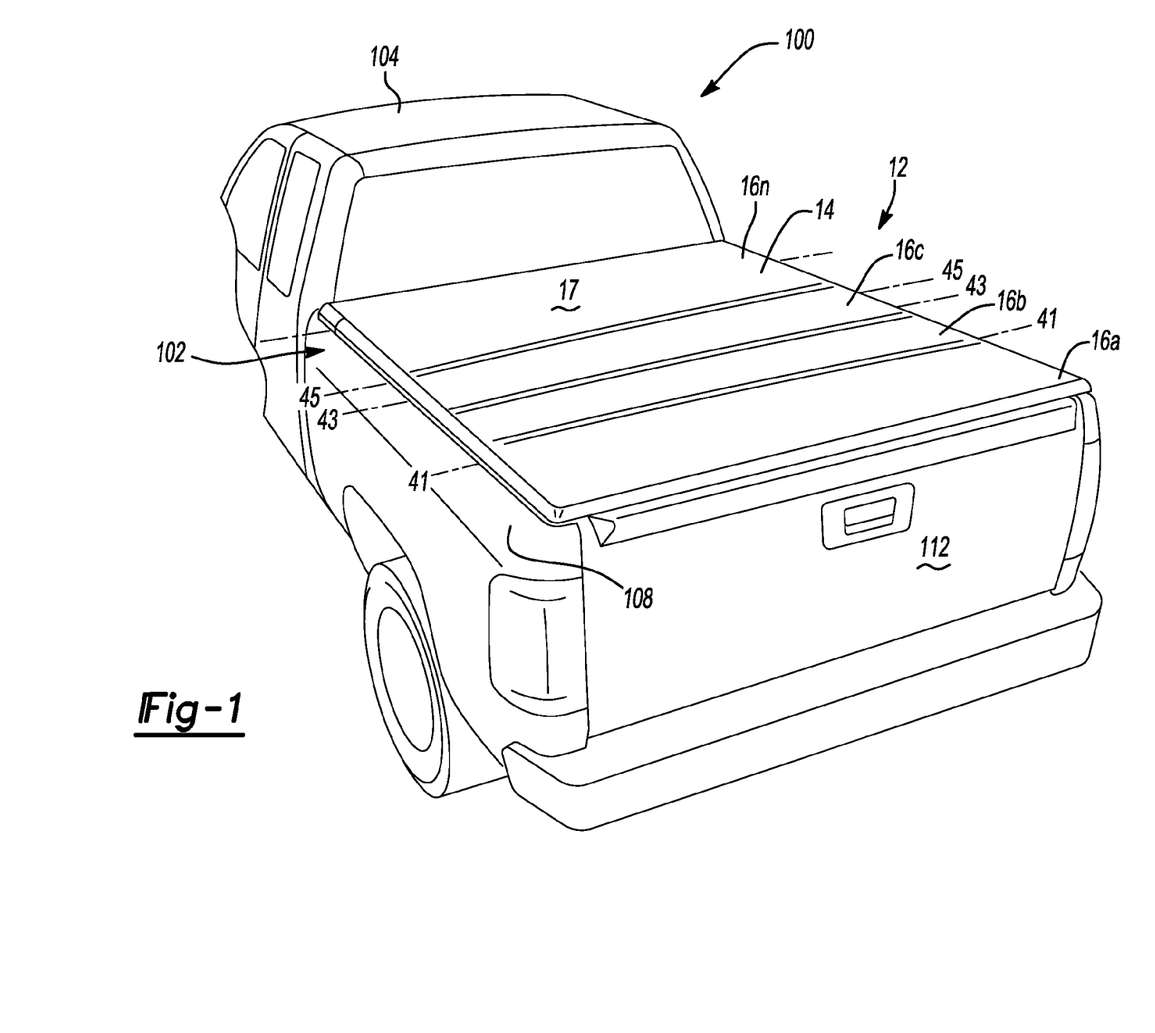
FIG. 1 is a perspective view illustrating a folding tonneau cover according to the principles of the present teachings positioned upon a cargo box of a pickup truck.
Figure 2A:
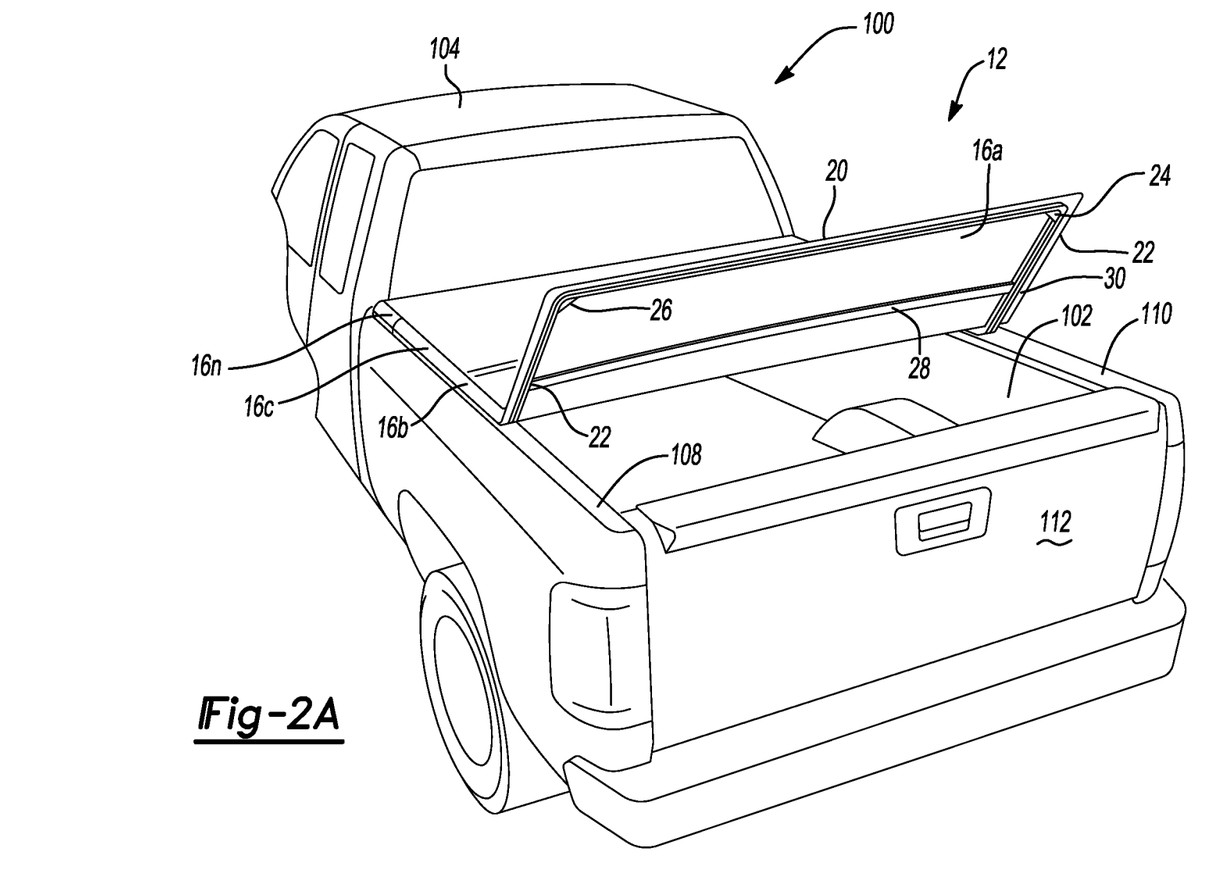
FIG. 2A is a perspective view illustrating the folding tonneau cover having a first tonneau section raised.
Figure 2B:
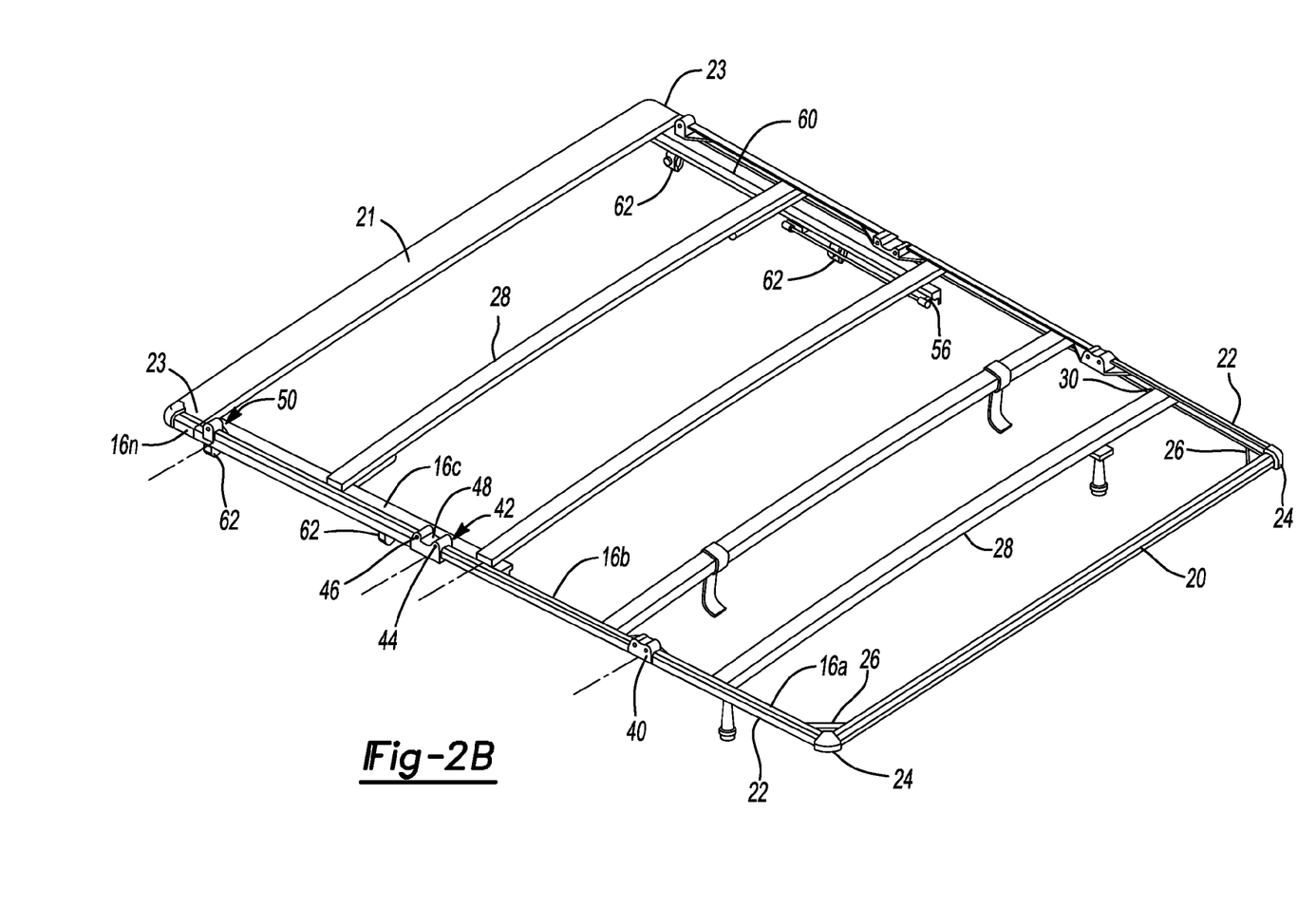
FIG. 2B is a perspective view illustrating the frame network of the folding tonneau cover.
Figure 3:
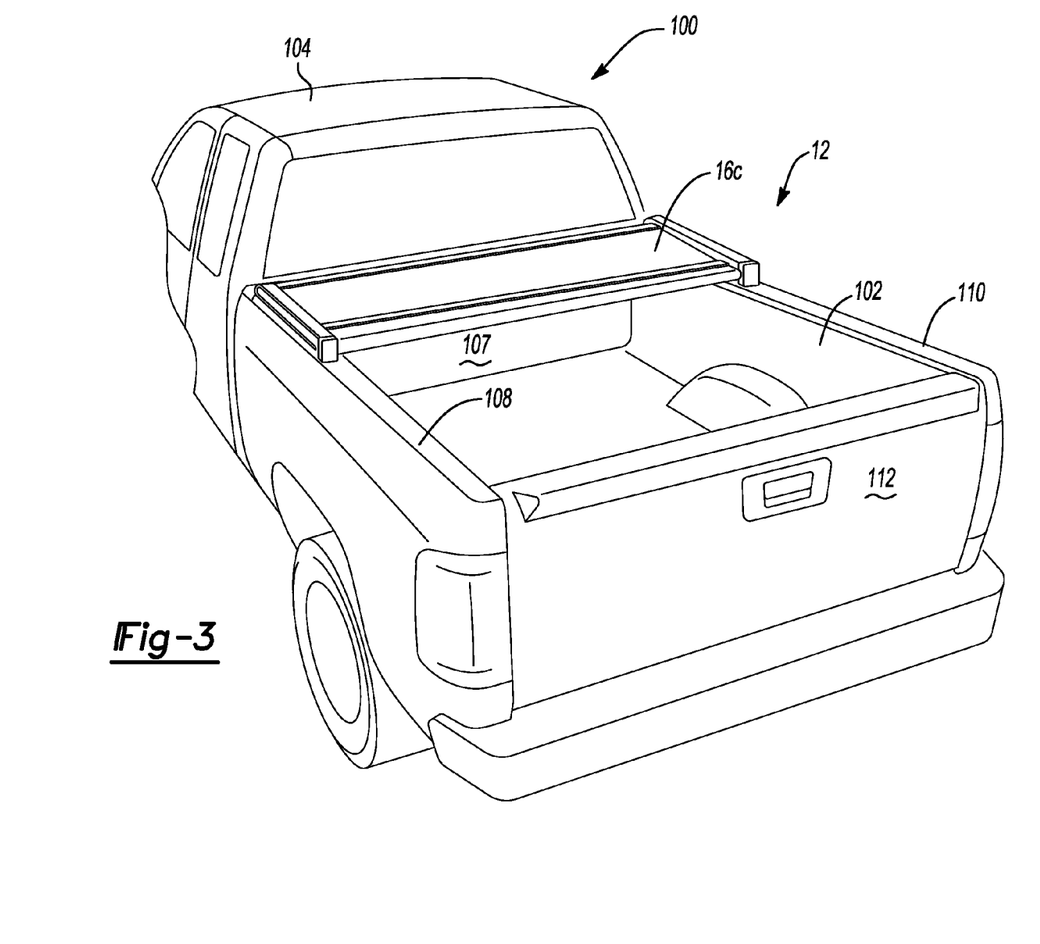
FIG. 3 is a perspective view illustrating the folding tonneau cover with the combination of the first tonneau section and the second tonneau section being folded upon a third tonneau section.

With particular reference to FIGS. 2A, 2B, and 5-8, each of the plurality of tonneau sections 16a-16n are pivotally coupled to an adjacent one of the plurality of tonneau sections for pivotal movement relative thereto along a hinge axis. The hinge axis is disposed in a cross-vehicle direction, as illustrated in FIG. 1. For example, first tonneau section 16a is hingedly connected with second tonneau section 16b via a first hinge system 40. In some embodiments, first hinge system 40, including additional hinge systems detailed herein, can comprise a living hinge. However, it should be appreciated that alternative hinge systems can be used throughout the present invention, including a piano or continuous hinge, a butt hinge, a strap hinge, or any other hinge system providing a reliable and actuatable interconnection between adjacent tonneau sections. However, first hinge system 40 can be configured to permit first tonneau section 16a to be pivoted about hinge axis 41 (FIG. 1) and stacked in a closely conformed position relative to adjacent second tonneau section 16b. To this end, first hinge system 40 can be a single hinge member positioned at a location generally coplanar with a top surface 17 of first tonneau section 16a and second tonneau section 16b such that the top surface 17 of first tonneau section 16a is generally tightly nested with top surface 17 of second tonneau section 16b when first and second tonneau sections 16a, 16b are in a retracted and stacked position.

With continued reference to FIGS. 2A, 2B, and 5-8, in some embodiments, second tonneau section 16b is hingedly connected with third tonneau section 16c via a second hinge system 42. In some embodiments, second hinge system 42 can comprise a first hinge element 44 and a second hinge element 46 being interconnected via a spacer element 48. It should be appreciated, however, that alternative hinge systems can be used throughout the present invention, including a piano or continuous hinge, a butt hinge, a strap hinge, or any other hinge system providing a reliable and actuatable interconnection between adjacent tonneau sections. With particular reference to FIGS. 2A, 2B, and 5-8, in some embodiments, first hinge element 44 of second hinge system 42 can be hingedly interconnected between second tonneau section 16b and spacer element 48. Likewise, in some embodiments, second hinge element 44 of second hinge system 42 can be hingedly interconnected between spacer element 48 and third tonneau section 16c. In this way, pivotal movement of second tonneau section 16b relative to third tonneau section 16c is accomplished through the pivotal rotation of both first hinge element 44 and second hinge element 46.

As should be appreciated, during a stacking movement, first tonneau section 16a is rotated about first hinge system 40 such that it is positioned in a stacked and nested position on top of second tonneau section 16b. Henceforth, second tonneau section 16b, together with nested first tonneau section 16a, are rotated about second hinge system 42 such that the nested combination of first tonneau section 16a and second tonneau section 16b are positioned in a stacked and nested position on top of third tonneau section 16c. Specifically, first tonneau section 16a is thus positioned in stacked relation between second tonneau section 16b and third tonneau section 16c (see FIG. 7). Therefore, spacer element 48 is sized to accommodate the increased stacked thickness of the combination of first tonneau section 16a and second tonneau section 16b relative to third tonneau section 16c. Generally speaking, the width of spacer element 48 is about equal to the distance between the top surface 17 of second tonneau section 16b and the top surface 17 of third tonneau section 16c.

More particularly, second hinge system 42 can be configured to permit second tonneau section 16b to be pivoted about hinge axis's 43 and 45 (FIG. 1) and stacked in a closely-conformed, nested position relative to adjacent third tonneau section 16c. To this end, hinge elements 44 and 46 of second hinge system 42 can be positioned at a location generally coplanar with top surface 17 of second tonneau section 16b, third tonneau section 16c, and spacer element 48 such that first tonneau section 16a, second tonneau section 16b, and third tonneau section 16c are nested parallel in the retracted and stacked position.

Finally, with continued reference to FIGS. 2A, 2B, and 5-8, in some embodiments, third tonneau section 16c is hingedly connected with fourth tonneau section 16n via a third hinge system 50. In some embodiments, third hinge system 50 can be configured to permit third tonneau section 16c, and more particularly, the combination of first tonneau section 16a, second tonneau section 16b, third tonneau section 16c, and the associated hinge systems, to be pivoted about hinge axis 51 (FIG. 1) and positioned in a generally upright or vertical position (also known as a retracted, stacked, and rotated upward position). It should be understood that the aforementioned generally upright or vertical position can be (1) substantially vertical (see FIGS. 4, 8, and 12) (2) pivoted such that it is inclined, yet substantially vertical, and rests upon or near passenger cabin 104 (see FIG. 4), and/or (3) pivoted such that it is inclined, yet substantially vertical, and rests upon fourth tonneau section 16n (see FIG. 8). To this end, third hinge system 50 can be a single hinge member positioned at a location generally coplanar with a top surface 17 of third tonneau section 16c and fourth tonneau section 16n such that the rotation of the combination of first, second, and third tonneau sections 16a, 16b, and 16c does not result in any binding movement upon fourth tonneau section 16n when first, second, and third tonneau sections 16a, 16b, and 16c are in a retracted, stacked, and rotated upward position. Moreover, as particularly illustrated in FIGS. 9, 12, and 13, in some embodiments, hinge system 50 or an area adjacent thereto can comprise a ledge member 53 extending inboard therefrom to provide a support ledge for the combination of first, second, and third tonneau sections 16a, 16b, and 16c to rest thereupon in the pivoted position—that is, in the position where first, second, and third tonneau sections 16a, 16b, and 16c rest upon fourth tonneau section 16n (specifically, ledge member 53).

Figure 4:
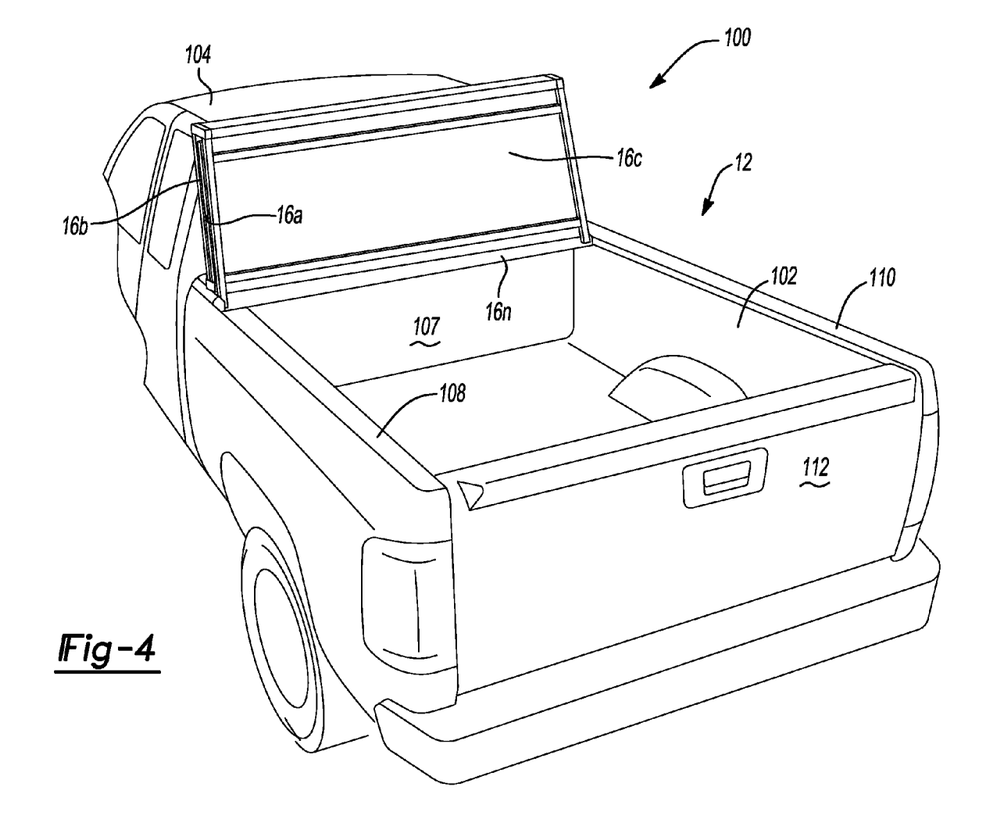
FIG. 4 is a perspective view illustrating the folding tonneau cover with a first tonneau section, a second tonneau section, and third tonneau section being collectively folded upon a fourth tonneau section and disposed in a retracted, stacked, and rotated upward position and resting upon the passenger cabin of the pickup truck.
Figure 5:
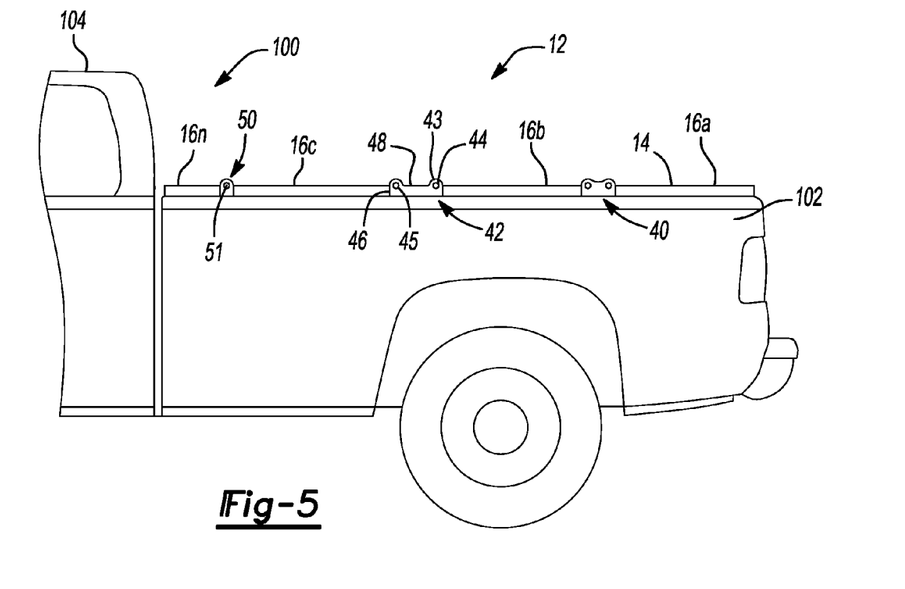
FIG. 5 is a side view illustrating the folding tonneau cover according to the principles of the present teachings positioned upon a cargo box of a pickup truck.
Figure 6:
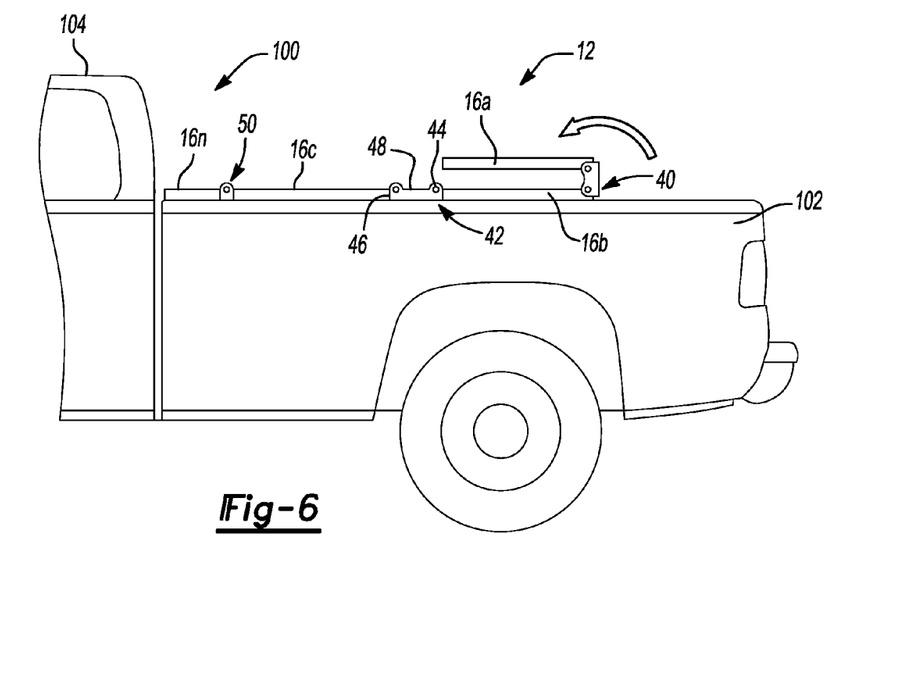
FIG. 6 is a side view illustrating the folding tonneau cover having the first tonneau section stacked upon the second tonneau section.
Figure 7:
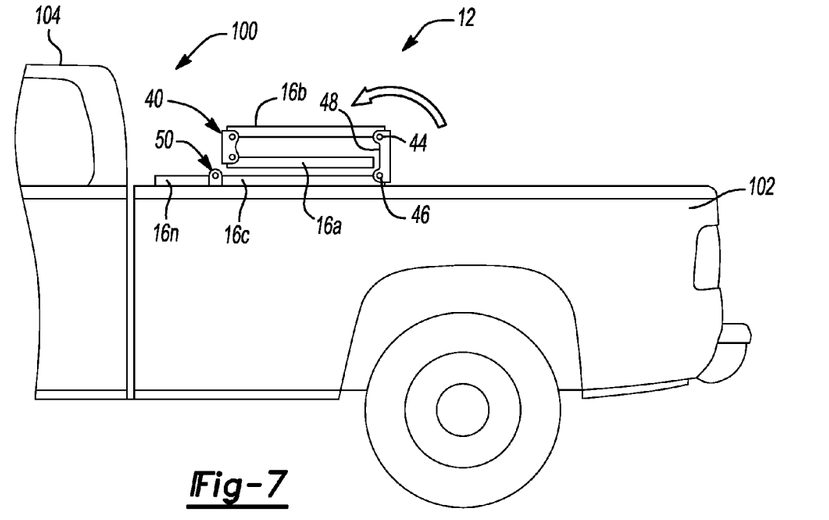
FIG. 7 is a side view illustrating the folding tonneau cover with the combination of the first tonneau section and the second tonneau section being stacked upon the third tonneau section.
Figure 8:
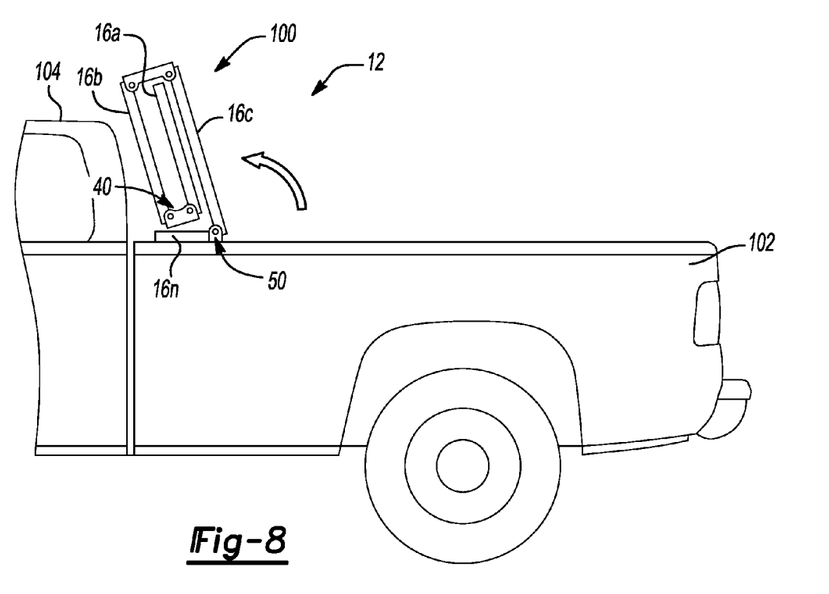
FIG. 8 is a side view illustrating the folding tonneau cover with a first tonneau section, a second tonneau section, and third tonneau section being collectively folded upon the fourth tonneau section such that it is resting on the fourth tonneau section and disposed in a retracted, stacked, and rotated upward position, being generally vertical.

In some embodiments, as illustrated in FIGS. 9-14, foldable tonneau system 12 can comprises a standoff system 52 for retaining the combination of first tonneau section 16a, second tonneau section 16b, third tonneau section 16c, and the associated hinge systems, in the generally upright or vertical position (specifically, the retracted, stacked, and rotated upward position) of FIGS. 4 and 8.

Figures 9, 10A:
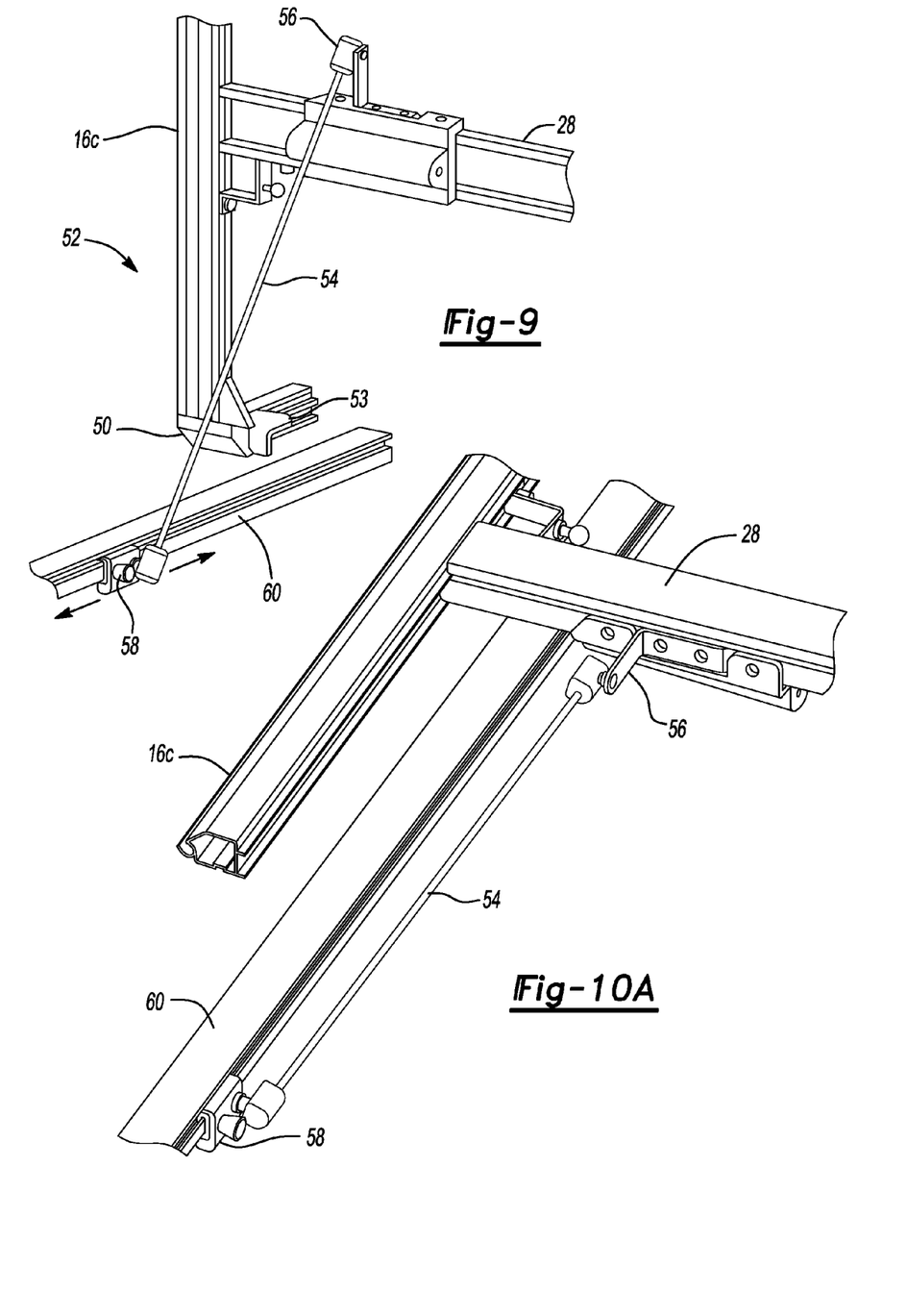
FIG. 9 is a perspective view of the standoff device according to the principles of the present teachings in the retracted, stacked, and rotated upward position.
FIG. 10A is a perspective view of the standoff device according to the principles of the present teachings having a linkage member with the folding tonneau cover in the extended position.
Figure 10B:
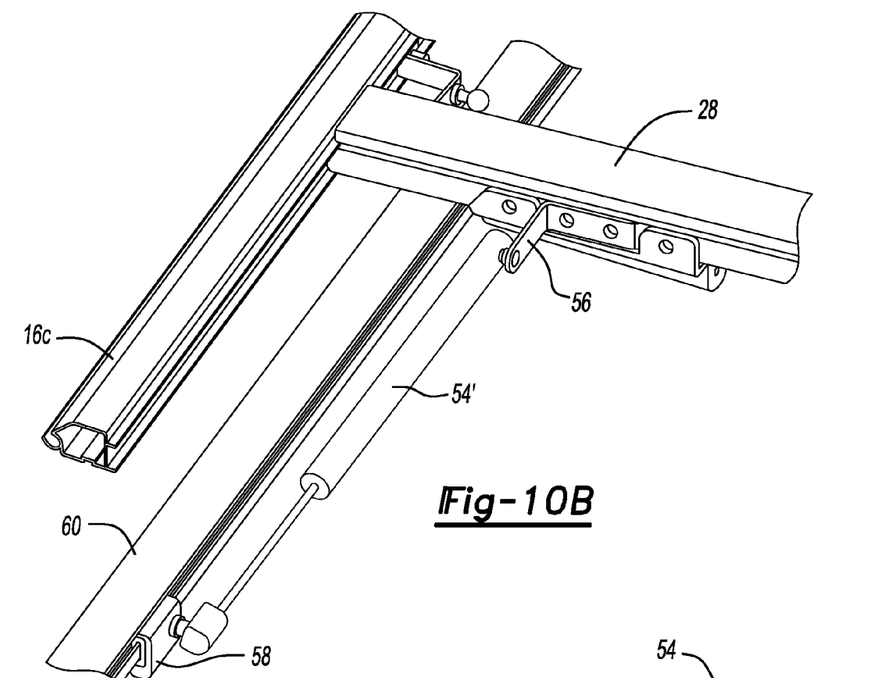
FIG. 10B is a perspective view of the standoff device according to the principles of the present teachings having a compressible device with the folding tonneau cover in the extended position.
Figure 11:
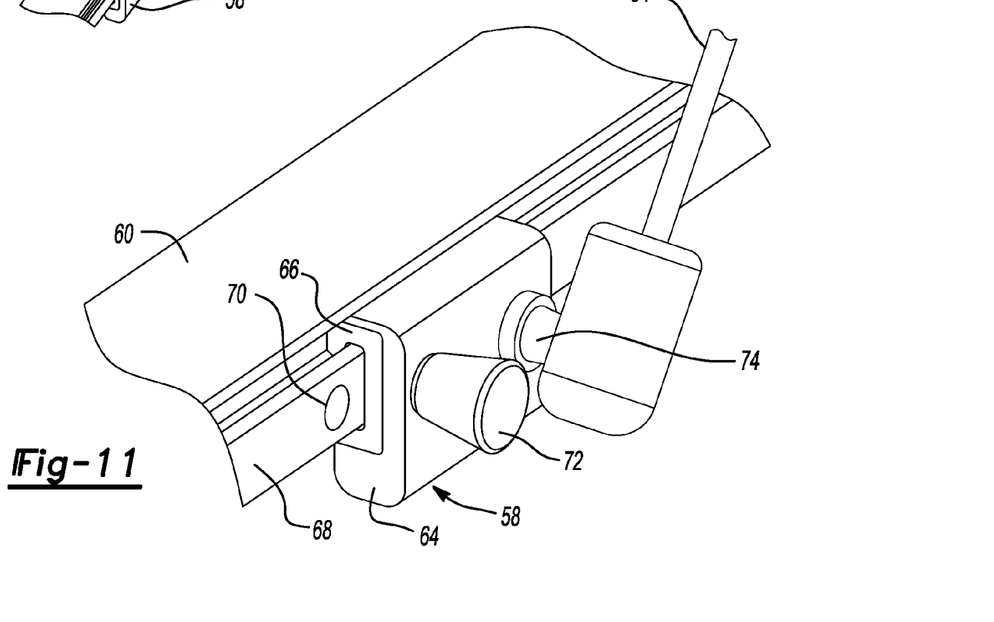
FIG. 11 is an enlarged perspective view of the retention bracket.

To this end, in some embodiments, as illustrated in FIGS. 9-11, standoff system 52 can comprise a standoff linkage 54 having opposing ends. In some embodiments, standoff linkage 54 can comprise a member having a fixed length having a first end coupled to a standoff bracket 56 and an opposing second end coupled to a retention bracket 58. Standoff bracket 56 can be configured to be mounted to a cross bow member 28, or other structure, of third tonneau section 16c for pivoting movement relative to cross bow member 28. In this way, standoff bracket 56 can rotate about or with cross bow member 28 or otherwise provide a rotation function to maintain a non-binding, straight connection with retention bracket 58 between the retracted, stacked, and rotated upward position (FIGS. 4, 8, and 9) and an extended, deployed position (FIGS. 1 and 10). In some embodiments, retention bracket 58 can comprise a slidable bracket that can slide along underbody rails 60. Underbody rails 60 can comprise rail members that are fixedly coupled to left sidewall 108 and right sidewall 110 via clamp members 62. This fixedly coupled connection can be accomplished in a generally convention manner using clamp members 62, therefore, in the interest of brevity, this connection will not be specifically described. Each slidable bracket 58, as illustrated in FIG. 11, can be slidably engaged with the associated underbody rail 60, such that a bracket body 64 having a generally C-shaped slot 66 for slidably engaging a corresponding C-shaped edge 68 of underbody rail 60. One or more positioning holes 70 can be formed in C-shaped edge 68 of underbody rail 60 to receive a biased plunger 72 therein. Biased plunger 72 is operably coupled through bracket body 64 of slidable bracket 58 and is biased into an engaging position with positioning hole 70. During movement of slidable bracket 58 along underbody rail 60, plunger 72 is pulled toward a centerline of the vehicle, against its biasing force, to remove plunger 72 from positioning hole 70. Slidable bracket 58 can then be slid along underbody rail 60 to one or more positions (thereby permitting plunger 72 to be biased into a positioning hole) to retain the combination of first tonneau section 16a, second tonneau section 16b, third tonneau section 16c, and the associated hinge systems, in the generally upright or vertical position (specifically, the retracted, stacked, and rotated upward position) of FIGS. 4 and 8. It should be understood that additional positioning holes can be used for intermediate positions of the combination. Moreover, it should be understood that a positioning hole is not necessary for the extended, deployed position (FIG. 1); however, a positioning hole can be used for retention in the extended, deployed position, if desired.

Slidable bracket 58 can further comprise a pivot stud 74 extending from bracket body 64 and pivotally coupled to an end of standoff linkage 54. In some embodiments, pivot stud 74 can comprise a ball and socket connection with standoff linkage 54.

It should be understood that in some embodiments, as illustrated in FIG. 10B, standoff linkage 54 can comprise a gas spring, pneumatic piston, or similar compressible device 54', for urging and/or retain the combination of first tonneau section 16a, second tonneau section 16b, third tonneau section 16c, and the associated hinge systems, in the generally upright or vertical position. In this embodiment, if desired, the sliding feature of slidable bracket 58 can be eliminated, thereby requiring slidable bracket 58 to become merely retention bracket 58 being fixedly coupled to underbody rail 60 in a single position.

Figure 12:
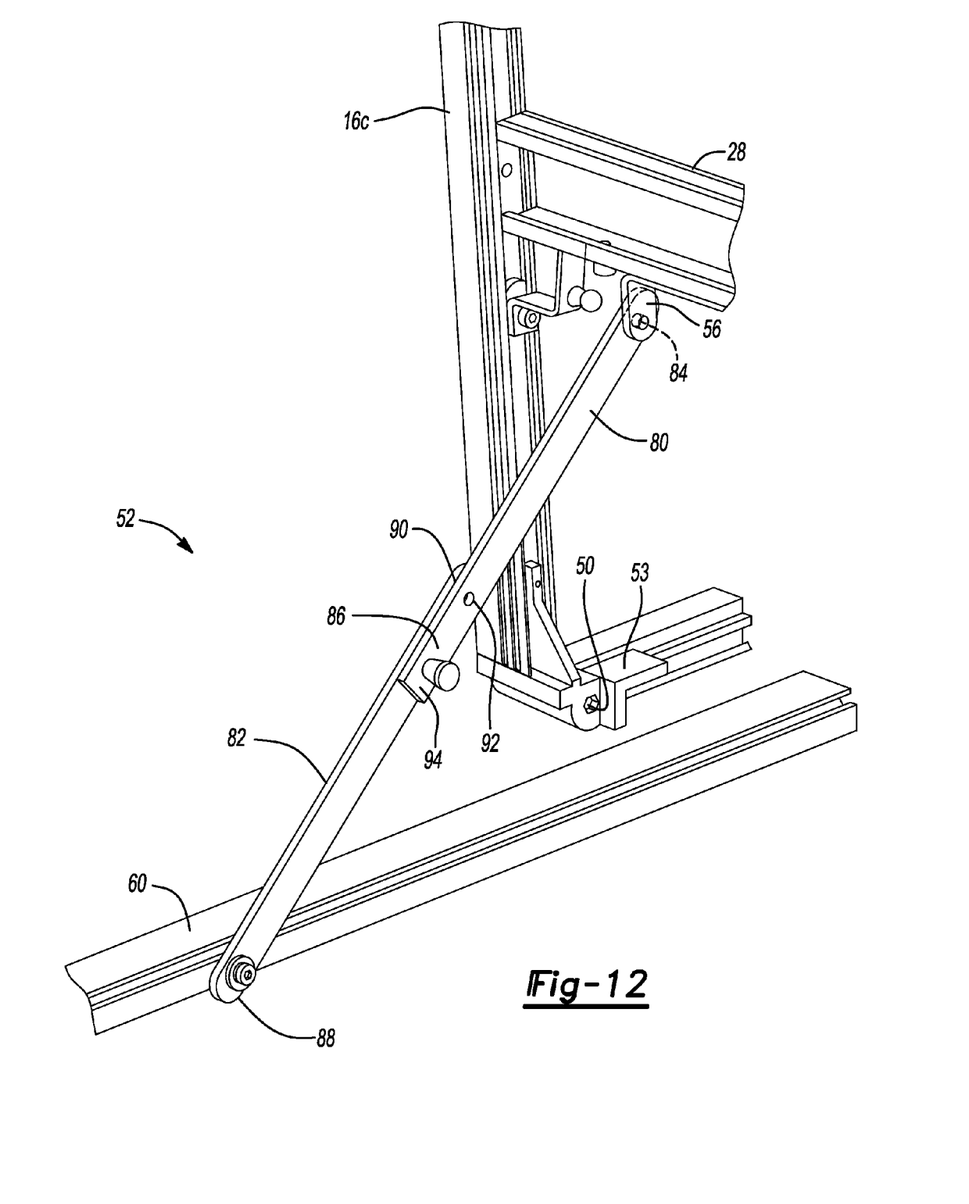
FIG. 12 is a perspective view of the two-bar linkage standoff device according to the principles of the present teachings in the retracted, stacked, and rotated upward position.
Figure 13:
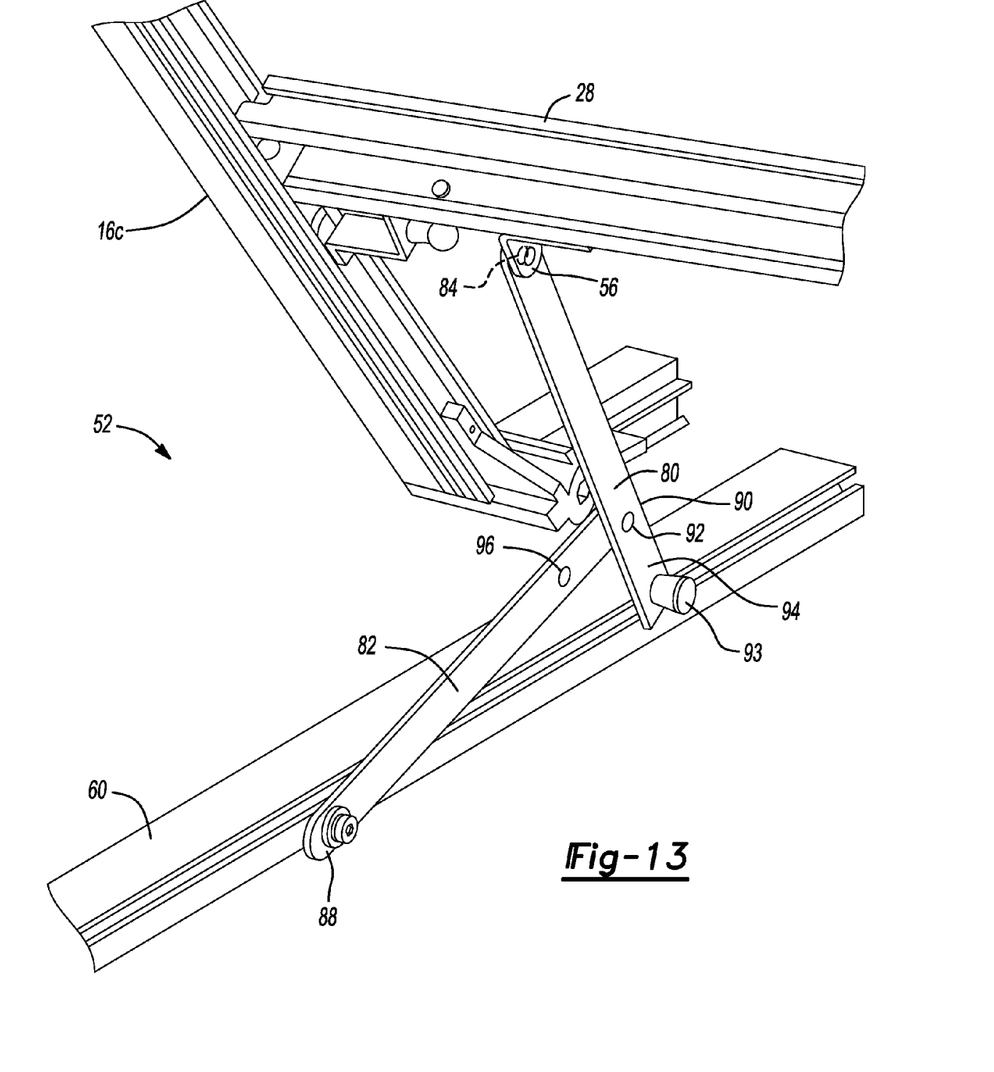
FIG. 13 is a perspective view of the two-bar linkage standoff device according to the principles of the present teachings in an intermediate position.
Figure 14:
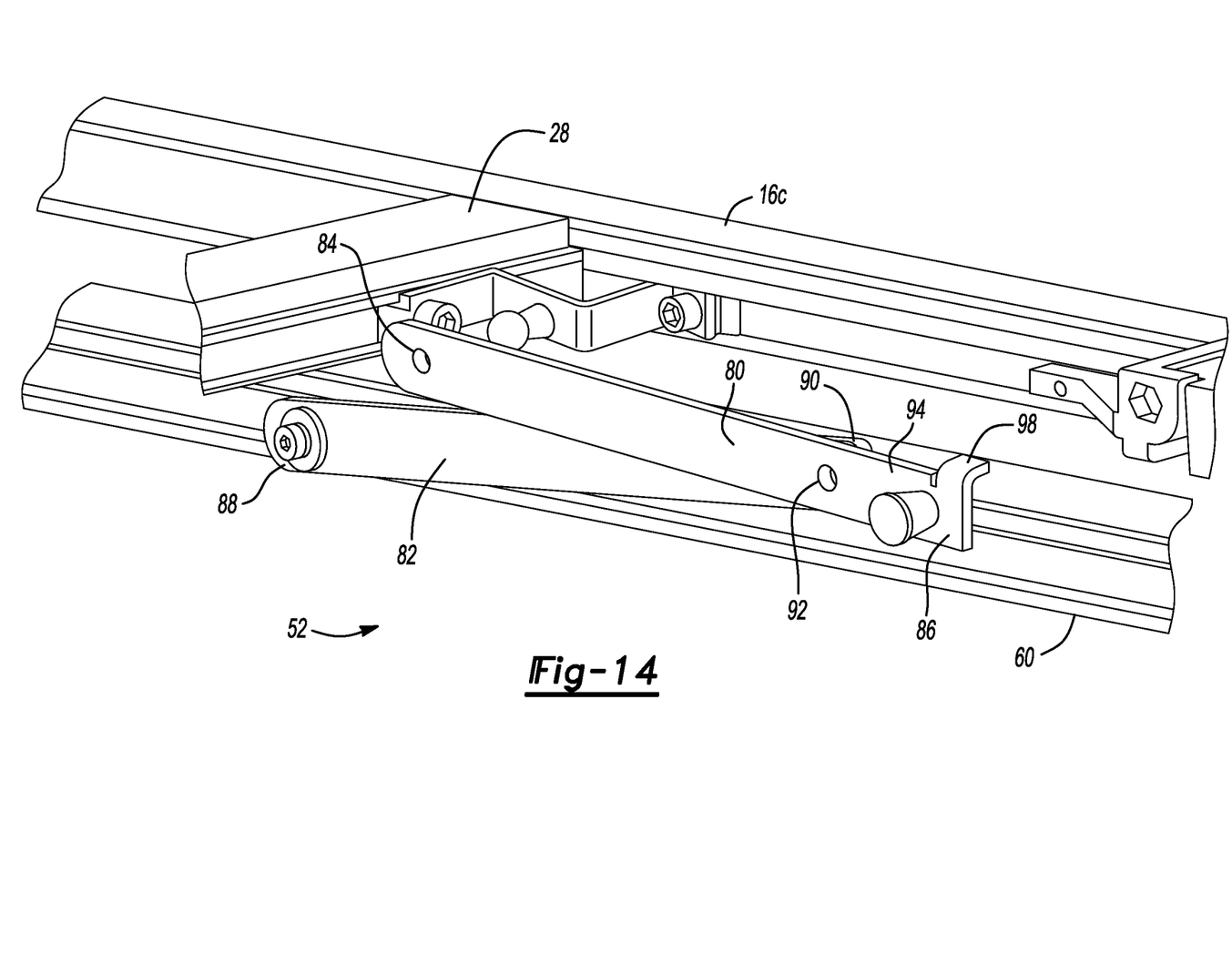
FIG. 14 is a perspective view of the two-bar linkage standoff device according to the principles of the present teachings with the folding tonneau cover in the extended position.

In some embodiments, as illustrated in FIGS. 12-14, standoff system 52 can comprise a 2-bar standoff linkage having a first linkage 80 and a second linkage 82. First linkage 80 can comprise a bar member having opposing ends 84, 86. End 84 can be pivotally coupled to standoff bracket 56 for similar operation as described above. Second linkage 82 can comprise a bar member having opposing ends 88, 90. End 88 can be pivotally coupled to underbody rail 60 via a fastener. End 90 can be pivotally coupled to a point 92 along first linkage 80. Point 92 can be positioned between ends 84, 86 to provide an overhang portion 94 of first linkage 80. Overhang portion 94 can be used to selectively lock pivoting rotation of first linkage 80 relative to second linkage 82. In some embodiments, overhang portion 94 can comprise a biased plunger 93 being biased into engagement with a corresponding locking hole 96 (FIG. 13) formed in second linkage 82, thereby operable to prevent relative pivoting of first linkage 80 and second linkage 82 (to retain the combination of first tonneau section 16a, second tonneau section 16b, third tonneau section 16c, and the associated hinge systems, in the generally upright or vertical position). In some embodiments, either singly or in combination with a locking feature such as plunger 93, overhang portion 94 can comprise an outwardly-turned tab feature 98 to engage a side portion of second linkage 82 when in the generally upright or vertical position. Tab feature 98 can serve to generally retain first linkage 80 and second linkage 82 in a deployed position and can further help to simplify the alignment of plunger 93 and locking hole 96, when used.

Each of the plurality of tonneau sections 16a-16n can be selectively engaged and/or retaining relative to adjacent underbody rails 60 and/or rails members coupled to the sidewalls 108, 110 of the pickup truck using any one of a number of various systems. For example, in some embodiments, first tonneau section 16a can be retained in the extended position using one or more spring latch retainers, such as those disclosed in commonly-assigned U.S. patent application Ser. No. 13/572,878, filed Aug. 13, 2012. Likewise, in some embodiments, third tonneau section 16c can be retained using one or more slam latches, such as those disclosed in U.S. patent application Ser. No. 13/962,091, filed Aug. 8, 2013. These applications are incorporated herein by reference.

According to the principles of the present teachings, a tonneau cover system is provided having a plurality of foldable sections, having a single cover member extending along the plurality of foldable sections, and being stackable in a generally-vertical position adjacent the passenger cabin of the pickup truck. As discussed herein, the folding and stacking function of the present teachings permits greater access to the pickup bed compared to conventional folding tonneau cover system.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A tonneau cover system for a cargo box of a pickup truck, said pickup truck having a passenger cabin, said tonneau cover system comprising:
   a plurality of tonneau sections being positionable generally over the cargo box of the pickup truck, said plurality of tonneau sections having at least a first tonneau section, a second tonneau section, a third tonneau section, and a fourth tonneau section, said plurality of tonneau sections being generally coplanar in an extended position;
   a single flexible cover member spanning and covering at least said first, second, and third tonneau sections;
   a first hinge system hingedly coupling said first tonneau section and said second tonneau section to permit pivotal stacked nesting of said first tonneau section relative to said second tonneau section;
   a second hinge system hingedly coupling said second tonneau section to said third tonneau section to permit pivotal stacked nesting of the combination of said first tonneau section and said second tonneau section relative to said third tonneau section; and
   a third hinge system hingedly coupling said third tonneau section to said fourth tonneau section to permit pivotal movement of the combination of said first tonneau section, said second tonneau section, and said third tonneau section relative to said fourth tonneau section into a retracted, stacked, and rotated upward position.

2. The tonneau cover system according to claim 1 wherein said retracted, stacked, and rotated upward position is generally vertical.

3. The tonneau cover system according to claim 1 wherein said retracted, stacked, and rotated upward position permits the combination of said first tonneau section, said second tonneau section, and said third tonneau section to be generally vertical and adjacent the passenger cabin of the pickup truck.

4. The tonneau cover system according to claim 1 wherein said second hinge system comprises:
   a spacer element;
   a first hinge element hingedly coupling said second tonneau section to said spacer element; and
   a second hinge element hingedly coupling said third tonneau section to said spacer element.

5. The tonneau cover system according to claim 4 wherein said spacer element is sized to permit parallel nesting of said first tonneau section, said second tonneau section, and said third tonneau section.

6. The tonneau cover system according to claim 1, further comprising:
   a standoff device operably coupled to said third hinge system, said standoff device operable to at least partially retain the combination of said first tonneau section, said second tonneau section, and said third tonneau section in said retracted, stacked, and rotated upward position.

7. The tonneau cover system according to claim 6 wherein said standoff device comprises:
   an underbody rail being connectable to the cargo box of the pickup truck;
   a retention bracket being slidably coupled to said underbody rail for movement along said underbody rail, said retention bracket being selectively positionable along said underbody rail at a position sufficient to at least partially retain the combination of said first tonneau section, said second tonneau section, and said third tonneau section in said retracted, stacked, and rotated upward position; and
   a standoff linkage being pivotally coupled between said retention bracket and said third tonneau section.

8. The tonneau cover system according to claim 6 wherein said standoff device comprises:
   an underbody rail being connectable to the cargo box of the pickup truck; and
   a standoff linkage being pivotally coupled between said underbody rail and said third tonneau section, said standoff linkage being selectively positionable rail at a position sufficient to at least partially retain the combination of said first tonneau section, said second tonneau section, and said third tonneau section in said retracted, stacked, and rotated upward position.

9. The tonneau cover system according to claim 8 wherein said standoff linkage is a compressible device.

10. The tonneau cover system according to claim 9 wherein said standoff linkage is a gas spring device.

11. The tonneau cover system according to claim 6 wherein said standoff device comprises:
    an underbody rail being connectable to the cargo box of the pickup truck; and
    a two-bar standoff linkage assembly being pivotally coupled between said underbody rail and said third tonneau section, said standoff linkage being selectively positionable rail at a position sufficient to at least partially retain the combination of said first tonneau section, said second tonneau section, and said third tonneau section in said retracted, stacked, and rotated upward position, said two-bar standoff linkage assembly having a first bar pivotally coupled to said third tonneau section and a second bar pivotally coupled to underbody rail, an end of one of said first bar and said second bar being pivotally coupled to an intermediate point of the other of said first bar and said second bar.

12. The tonneau cover system according to claim 11 wherein said standoff device further comprises:
   a plunger member extending from one of said first bar and said second bar and engageable with a hole formed on the other of said first bar and said second bar.

13. A tonneau cover system for a cargo box of a pickup truck, said pickup truck having a passenger cabin, said tonneau cover system comprising:
   a plurality of tonneau sections being positionable generally over the cargo box of the pickup truck, said plurality of tonneau sections having at least a first tonneau section, a second tonneau section, a third tonneau section, and a fourth tonneau section, said plurality of tonneau sections being generally coplanar in an extended position;
   a first hinge system hingedly coupling said first tonneau section and said second tonneau section to permit pivotal stacked nesting of said first tonneau section relative to said second tonneau section;
   a second hinge system hingedly coupling said second tonneau section to said third tonneau section to permit pivotal stacked nesting of the combination of said first tonneau section and said second tonneau section relative to said third tonneau section;
   a third hinge system hingedly coupling said third tonneau section to said fourth tonneau section to permit pivotal movement of the combination of said first tonneau section, said second tonneau section, and said third tonneau section relative to said fourth tonneau section into a retracted, stacked, and rotated upward position; and
   a standoff device operably coupled to said third hinge system, said standoff device operable to at least partially retain the combination of said first tonneau section, said second tonneau section, and said third tonneau section in said retracted, stacked, and rotated upward position.

14. The tonneau cover system according to claim 13 wherein said standoff device comprises:
   an underbody rail being connectable to the cargo box of the pickup truck;
   a retention bracket being slidably coupled to said underbody rail for movement along said underbody rail, said retention bracket being selectively positionable along said underbody rail at a position sufficient to at least partially retain the combination of said first tonneau section, said second tonneau section, and said third tonneau section in said retracted, stacked, and rotated upward position; and
   a standoff linkage being pivotally coupled between said retention bracket and said third tonneau section.

15. The tonneau cover system according to claim 13 wherein said standoff device comprises:
   an underbody rail being connectable to the cargo box of the pickup truck; and
   a standoff linkage being pivotally coupled between said underbody rail and said third tonneau section, said standoff linkage being selectively positionable rail at a position sufficient to at least partially retain the combination of said first tonneau section, said second tonneau section, and said third tonneau section in said retracted, stacked, and rotated upward position.

16. The tonneau cover system according to claim 15 wherein said standoff linkage is a compressible device.

17. The tonneau cover system according to claim 16 wherein said standoff linkage is a gas spring device.

18. The tonneau cover system according to claim 13 wherein said standoff device comprises:
   an underbody rail being connectable to the cargo box of the pickup truck; and
   a two-bar standoff linkage assembly being pivotally coupled between said underbody rail and said third tonneau section, said standoff linkage being selectively positionable rail at a position sufficient to at least partially retain the combination of said first tonneau section, said second tonneau section, and said third tonneau section in said retracted, stacked, and rotated upward position, said two-bar standoff linkage assembly having a first bar pivotally coupled to said third tonneau section and a second bar pivotally coupled to underbody rail, an end of one of said first bar and said second bar being pivotally coupled to an intermediate point of the other of said first bar and said second bar.

19. The tonneau cover system according to claim 18 wherein said standoff device further comprises:
   a plunger member extending from one of said first bar and said second bar and engageable with a hole formed on the other of said first bar and said second bar.

* * * * *